M. H. WINSLOW.
TRACK SCALE.
APPLICATION FILED JAN. 28, 1915.

1,268,197.

Patented June 4, 1918.
3 SHEETS—SHEET 1.

WITNESSES:
A. H. Edgerton
R. G. Lockwood

INVENTOR
Marlon H. Winslow.
BY
T. H. Lockwood
ATTORNEY

M. H. WINSLOW.
TRACK SCALE.
APPLICATION FILED JAN. 28, 1915.

1,268,197.

Patented June 4, 1918.
3 SHEETS—SHEET 3.

WITNESSES:
A H Edgerton
R Lockwood

INVENTOR
Marlon H. Winslow.
BY
V. H. Lockwood
ATTORNEY

UNITED STATES PATENT OFFICE.

MARLON H. WINSLOW, OF TERRE HAUTE, INDIANA.

TRACK-SCALE.

1,268,197.   Specification of Letters Patent.   Patented June 4, 1918.

Application filed January 28, 1915. Serial No. 4,884.

*To all whom it may concern:*

Be it known that I, MARLON H. WINSLOW, a citizen of the United States, and a resident of Terre Haute, county of Vigo, and State of Indiana, have invented a certain new and useful Track-Scale; and I do hereby declare that the following is a full, clear, and exact description thereof, reference being had to the accompanying drawings, in which like letters refer to like parts.

The object of this invention is to convert weighing scales having suspended beams and levers into scales having the beams and levers thereof fulcrumed on fixed bearings so as to prolong the life and utility of the scales and avoid the vibration of the parts of the scale and the further wear of the bearings. Many scales heretofore erected have been provided with suspended bearings so that the beams, levers and other parts would have a considerable amount of swing or vibration so that the bearings would be rapidly worn and the life of the scale rendered very brief. One object of this invention is to provide simple means for equipping those old worn out scales so that they can be used a great many years longer, and provide the same with compensating bearings.

The full nature of the invention will be understood from the accompanying drawings and the following description and claims.

Figure 1:
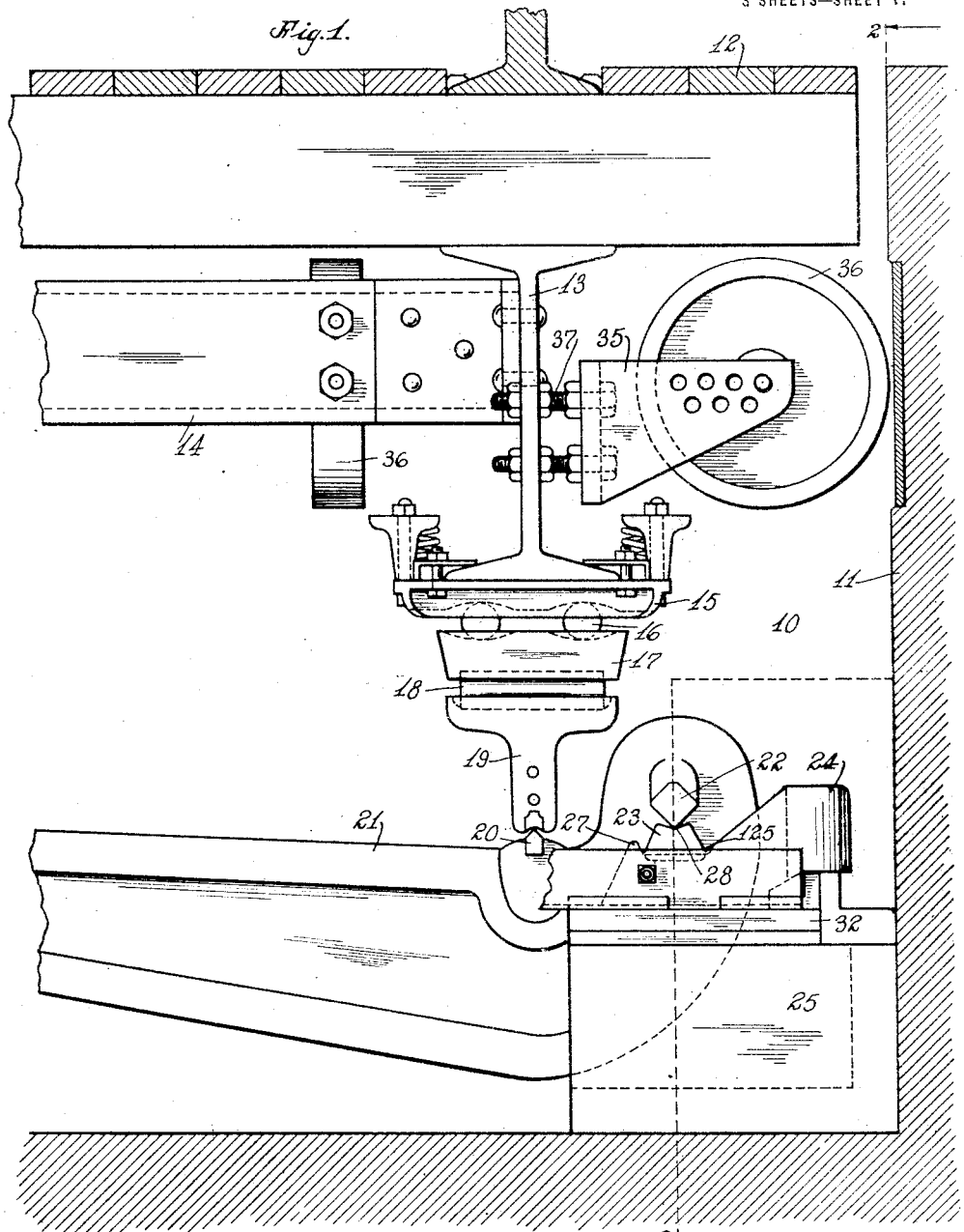
Figure 2:
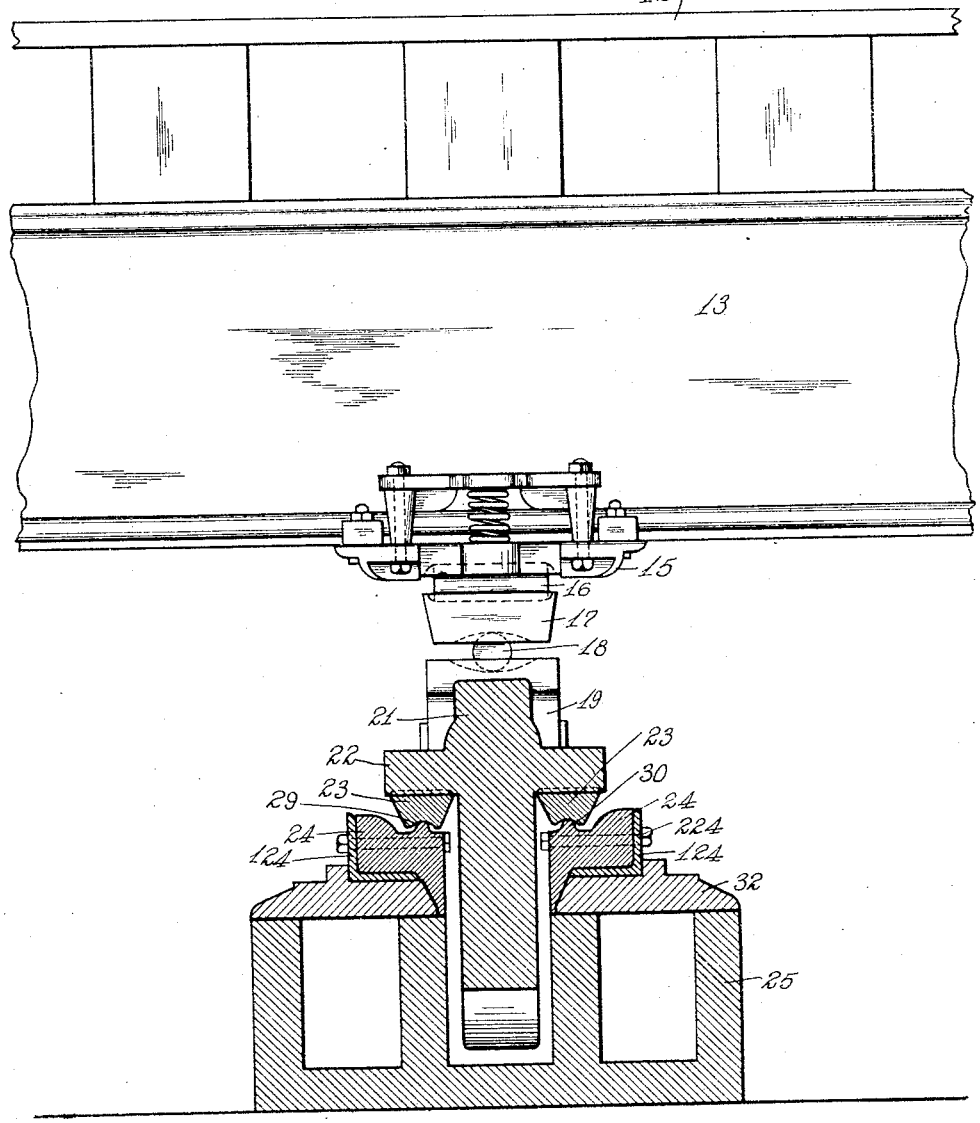
Figure 3:
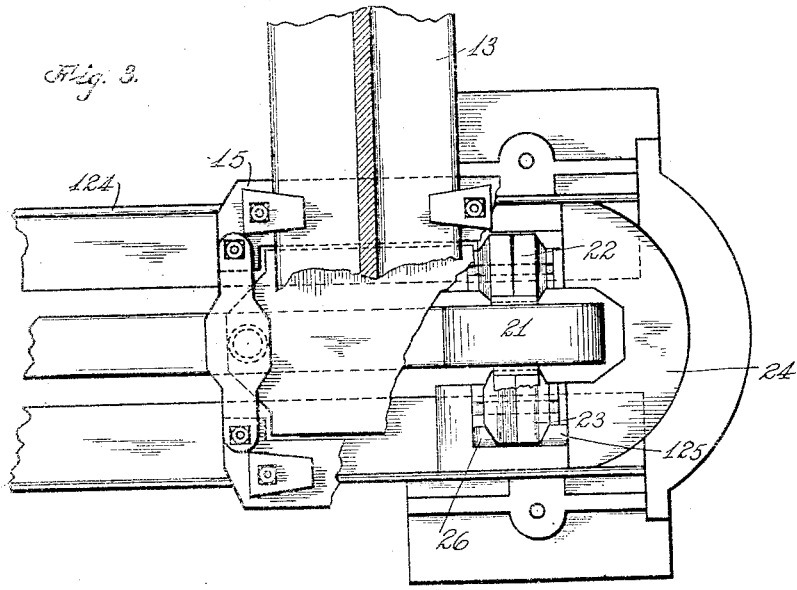
Figure 4:
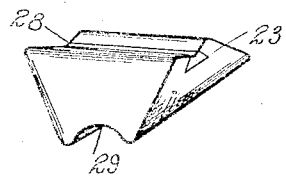

In the drawings, Figure 1 is a vertical section through a portion of a railway scale, the remainder being broken away. Fig. 2 is a partial section on the line 2—2 of Fig. 1. Fig. 3 is a plan view of a portion of the device with associate parts broken away. Fig. 4 is a perspective view of one of the bearing blocks.

In detail there is shown herein a pit 10 with cement bottom and walls 11 and a platform 12 carried on beams 13 braced by cross bars 14 and supported on a bearing member 15 and rollers 16 and bearing members 17 and rollers 18 at right angles to the rollers 16 and a bearing member 19 on a knife edge 20 in a platform supporting lever 21. Said platform supporting lever 21 has a knife edge bearing 22 for fulcruming it on a bearing block 23 which is supported by a bearing support 24 upon a foundation 25.

All of the foregoing mechanism excepting the parts 23, 24 and 25 have been used in the type of railway scales wherein the levers 21 are suspended by stirrups or the like. In other words, the knife edge bearings 22 rest in the stirrups supported from above, which stirrups are not here shown.

It is obvious that with the knife edge bearing 22 suspended in stirrups at every operation of the scale there is a rubbing of the stirrup and knife edge bearing on account of the vibratory movements of the parts of the scale. This very soon wears the knife edge bearing and the adjacent parts of the stirrup to such an extent that the scale does not operate accurately and is in such condition that the owner is compelled to throw it away and buy a new scale.

My invention consists in coming in at this stage of the life of such suspended type of scale and prolonging its life a number of years by removing the stirrup and placing the knife edge bearings 22 upon bearing blocks 23 so that the two will rock with reference to each other in one direction and then mounting the bearing blocks 23 upon the bearing support 24 so that the bearing blocks will rock upon said support in a direction at right angles to the rocking movement above referred to and inserting said bearing support 24 as herein shown, so as to afford a fixed instead of a suspended support for the bearing.

The bearing support 24 is U-shaped, as shown by the plan view in Fig. 3, so that it supports a bearing block 23 at each side of the lever 21 for the knife edge bearing 22 projecting from each side of the lever. The two ends of the bearing block 24 are recessed at 125 and 26 to receive the bearing blocks 23 and hold the same and there is a projection 27 extending upwardly at the extreme end of the bearing support 24 to prevent lateral displacement of the part 23 in that direction and at the other side of the bearing block 23 the support 24 is inclined upwardly so as to prevent displacement in that direction.

As shown in Fig. 4, the bearing block 23 has a recess 28 for the knife edge 22 so that they can rock with relation to each other in one direction and to provide a bearing surface for the knife edge 22 of a relatively harder material than the remainder of the block 23, an insert grooved piece 28ª of hardened material is dovetailed into block 23 to receive the knife edge 22. On the under side of the block 23 there is a recess 29 extending in a direction at a right angle to that of the recess 28 which rests upon a rib 30. This rib 30 is not knife edged and the recess 29 is curved transversely without any sharp angle, as in the recess 28, so that the parts 23 and 30 can have considerable inclined bearing surfaces for forming the knife thereof. The bearing block supports 24 may be arranged as shown in Fig. 2, having specially formed bearing portions 24 bolted in a frame 124 heretofore in use, by bolts 224, whereby said bearing portions can be replaced, if desired. The parts 24 and 124 are mounted upon a plate 32 on the support 25.

Another feature of the invention to prevent undue vibratory movement of the parts consists in securing to the beams 13 and 14 on which the platform is mounted, brackets 35 which carry anti-friction rollers 36 adapted to engage the side walls of the pit in which the scale is mounted. The brackets 35 are secured by nuts 37 so that said rollers can be adjusted and when adjusted they will all be close to the walls of the pit and travel up and down freely, but preventing undue vibratory movement of the platform scale parts. The rollers 36 do away with the use of check rods which would often get a little tight and obstruct the freedom of the vertical movement of the platform.

This scale, it is observed, has compensating roller bearings centrally over the knife edge bearings 20 so as to adjust the bearing elements above the knife edge and prevent escape of bearing element 19 from the knife edge 20 and any pounding on such knife edge. Compensating bearings have never been used on scales of the type herein referred to.

The invention claimed is:

1. A track weighing scale including walls forming a pit, a platform, a structure supporting the platform and having I beams parallel with the walls of the pit, brackets extending from said I beams toward the walls of the pit, means for mounting the brackets in the I beams so that they may be adjusted toward or away from the pit walls, and rollers in said brackets adapted to bear against the walls of the pit, substantially as set forth.

2. A weighing scale including a load supporting platform, an I-beam for supporting the same, an upper bearing member secured to the lower flange of the I-beam, an intermediate bearing member below said upper bearing member, rollers between the upper and intermediate bearing members, said members having parallel recesses in their meeting faces to receive said rollers, a lower bearing member, a roller between the intermediate and lower bearing members which extends transversely of the rollers between the upper and intermediate bearing members, said intermediate and lower bearing members having recesses in their meeting faces to receive said last roller, a platform supporting lever extending parallel with one set of said rollers, a knife edge on said lever extending parallel with the other set of said rollers and supporting said lower bearing member, a knife edge extending from each side of said lever and located above the top of the lever, a bearing block at each side of said lever for supporting said knife edges, a substantially U-shaped frame having its ends on opposite sides of the lever, and ribs on said U-shaped frame upon which said blocks are adapted to rest, said ribs extending at right angle to the knife edges on the lever.

In witness whereof, I have hereunto affixed my signature in the presence of the witnesses herein named.

MARLON H. WINSLOW.

Witnesses:
J. H. WELLS,
R. G. LOCKWOOD.

Copies of this patent may be obtained for five cents each, by addressing the "Commissioner of Patents, Washington, D. C."